United States Patent [19]

Sattler et al.

[11] 4,206,098

[45] Jun. 3, 1980

[54] HIGH SOLIDS POLYESTER-AMIDE-IMIDE WIRE ENAMELS

[75] Inventors: Frank A. Sattler, Monroeville; James R. Kwiecinski, Wilkins Township, Allegheny County, both of Pa.

[73] Assignee: Westinghouse Electric Corp., Pittsburgh, Pa.

[21] Appl. No.: 942,578

[22] Filed: Sep. 15, 1978

[51] Int. Cl.$^2$ .................. C09D 3/56; C09D 3/64; C09D 3/70; C09D 5/25
[52] U.S. Cl. .................. 260/20; 260/22 CQ; 260/22 TN; 260/33.2 R; 428/458; 428/460
[58] Field of Search .............. 260/20, 33.2 R, 22 TN, 260/22 CQ, 22 R

[56] References Cited

U.S. PATENT DOCUMENTS

| | | | |
|---|---|---|---|
| 3,479,307 | 11/1969 | Laganis | 260/20 |
| 3,523,820 | 8/1970 | Sheffer | 260/20 |
| 3,555,113 | 1/1971 | Sattler | 260/858 |
| 3,652,471 | 3/1972 | Sattler | 260/22 R |
| 3,789,037 | 1/1974 | Miller | 260/22 TN |
| 3,945,959 | 3/1976 | Lange | 260/20 |
| 4,049,599 | 9/1977 | Lott | 260/22 CQ |
| 4,107,355 | 8/1978 | Merchant et al. | 260/33.2 R |
| 4,117,032 | 9/1978 | Kwiecinski | 260/857 PE |
| 4,119,605 | 10/1978 | Keating | 260/33.2 R |
| 4,127,553 | 11/1978 | Osada et al. | 260/33.2 R |

*Primary Examiner*—Ronald W. Griffin
*Attorney, Agent, or Firm*—R. D. Fuerle

[57] ABSTRACT

A polyester-amide-imide wire enamel blend is disclosed which is made up of four components—a cross-linkable polyester, a linear polyester, a polyester amide-imide component, and a cresol formaldehyde resin. The cross-linkable polyester is the reaction product of a polyol which is mixture of diol and a triol, a polyfunctional carboxylic compound, and a catalyst. The linear polyester is the reaction product of a diol, a polyfunctional carboxylic compound, and a catalyst. The polyester-amide-imide component is the reaction product of a diamine, trimellitic anhydride, and a polyester which in turn is the reaction product of a polyol, a polyfunctional carboxylic compound, and a catalyst. The cresol formaldehyde resin is the reaction product of a phenol, formaldehyde, and an amine catalyst. All of the four components are in a solution of a carbitol. The polyester-amide-imide wire enamel blend also contains a fatty acid component which may be reacted into any of its polyester components.

25 Claims, No Drawings

HIGH SOLIDS POLYESTER-AMIDE-IMIDE WIRE ENAMELS

BACKGROUND OF THE INVENTION

Polyester-amide-imide wire enamels which are used commercially are high molecular weight, high viscosity, difficulty soluble polymers requiring strong, noxious solvents in large quantities, not only for application to wire, but also for proper reaction in the kettle. One widely used commercial polyester-amide-imide wire enamel is made by blending four reaction products (see U.S. Pat. No. 3,555,113):

(1) a polyester-amide-imide with high amide-imide content (which requires a high solvent content, specifically cresylic acid, in the reaction kettle to keep the reaction mixture mobile during critical periods of the reaction);

(2) a polyester;

(3) a polyurethane blocked isocyanate; and (4) a low molecular weight phenolic resin. The final resin is dissolved to 25% to 30% solids in a cresylic acid-aromatic hydrocarbon solvent mixture. The effluent from the stoving of this wire enamel is ecologically unacceptable and must be burned in an incinerator.

DESCRIPTION OF THE PRIOR ART

U.S. patent application Ser. No. 726,036, filed Sept. 23, 1975, now U.S. Pat. No. 4,117,032 issued Sept. 26, 1978, by James R. Kwiecinski, discloses a wire-coating powder prepared by first formulating a solventless aromatic polyester-amide-imide. Excess polyol is used to replace the solvent.

SUMMARY OF THE INVENTION

We have found that a polyester-amide-imide wire enamel blend having excellent properties can be made at a very high solids concentration using an ecologically acceptable solvent. The solvents used in this invention are carbitols, which are high-boiling and have been designated under Rule 66 as ecologically acceptable solvents. The resin is applied to wire in the conventional manner and its properties on wire match those of good class 150° C. to class 180° C. conventional wire enamels.

DESCRIPTION OF THE INVENTION

The following is a description of the ingredients used in practicing this invention.

SOLVENT

The solvent is a carbitol, that is, a diethylene glycol monoalkyl ether or a diethylene glycol monoalkyl ether acetate where the alkyl group is $C_1$ to $C_4$. Carbitol esters are preferred because they react less into the polymer, and acetate esters are preferred because they are commercially available. Specifically, the preferred carbitols are diethylene glycol monoethyl ether (commonly called "carbitol"), and diethylene glycol monoethyl ether acetate (commonly called "carbitol acetate"), because they are high-boiling solvents and are ecologically acceptable. Other carbitols which can be used include diethylene glycol monobutyl ether, diethylene glycol monopropyl ether acetate, etc.

POLYOL

Diols which can be used in this invention include cyclohexanedimethanol, triethylene glycol, ethylene glycol, 1,4-butane diol, neopentyl glycol, propylene glycol, 1,5-pentanediol, etc. The preferred diols are triethylene glycol, ethylene glycol, 1,4-butane diol, and neopentyl glycol because they have been found to work well and are inexpensive.

Triols which can be used in this invention include tris (2-hydroxyethyl) isocyanurate (THEIC), glycerol, trimethylol ethane, and trimethylol propane. The preferred triol is THEIC because it produces wire enamels having better thermal properties.

FATTY ACID

The fatty acid is a $C_{12}$ to $C_{18}$ monocarboxylic unsaturated acid. Fatty acids which can be used in this invention include soya, linseed, tung, etc. The preferred fatty acid is soya because it produces wire enamels having good thermal stability and it is relatively inexpensive.

DIAMINE

Suitable diamines include meta phenylene diamine, methylene dianiline, 2,6-diamino toluene, 2,4-diamino toluene, etc. The preferred diamine is meta phenylene diamine because it produces enamels having greater thermal stability.

In the preferred method of making the polyester-amide-imide wire enamel blend of this invention, four components are first separately prepared. These components are a cross-linkage polyester, a linear polyester, a polyester-amide-imide, and a cresol formaldehyde resin.

PREPARATION OF CROSS-LINKABLE POLYESTER

The cross-linkage polyester is prepared by first mixing together a polyol, a polyfunctional carboxylic compound, a diethylene glycol monoalkyl ether acetate (hereinafter called a "carbitol acetate"), and a catalyst. A fatty acid is preferably also included in the composition.

The polyol is a mixture of a triol and diol in molar ratio of triol to diol of infinity to about 1:1. The preferred molar ratio of triol to diol is about 5:1 to about 15:1. The amount of polyol used in the composition should be the stoichiometric equivalent required to react with the carboxylic acid plus about 30 to about 60 equivalent percent in excess.

The carboxylic compound must be at least 80% selected from the group consisting of terephthalic acid, isophthalic acid, or alkyl esters of terephthalic acid or isophthalic acid up to $C_3$. The rest of the carboxylic compound used in the composition may be trimellitic acid, trimellitic anhydride, maleic anhydride, adipic acid, or another aliphatic carboxylic acid. Mixtures of various acids or their esters are also contemplated. The preferred acid is terephthalic acid because it is inexpensive. It is preferable to use the dimethyl esters of the acids as they react more easily.

The amount of carbitol acetate in the composition should be about 5 to about 20% by weight, based on the total composition of cross-linkable polyester.

The catalyst is a condensation catalyst if the carboxylic compound has acid or anhydride groups and is an ester-interchange catalyst if the carboxylic compound is an ester. The ester-interchange catalyst is preferably an organic titanate ester such as tetraisopropyl titanate or butyl titanate. Tetraisopropyl titanate is preferred. The condensation catalyst is preferably dibutyl tin oxide. Butyl stannoic acid can also be used, but dibutyl tin oxide is preferred. The amount of catalyst used should be about 0.5 to about 2 g. per mole of dicarboxylic acid.

The fatty acid, which is preferably present in the cross-linkable polyester, should be used in an amount equal to about 5 to about 10 mole percent of the amount of carboxylic compound.

Once the composition is prepared, it is heated to form the cross-linkable polyester. A suitable and preferred reaction schedule is to heat rapidly to 180° C., then to increase the temperature at a rate of 10° C. per hour up to 205° C., then to increase the temperature at a rate of 15° C. per hour up to 250° C. A carbitol is then added to bring the solids content down to about 55 to about 75% solids.

PREPARATION OF LINEAR POLYESTER

The linear polyester is prepared from a diol, a dicarboxylic acid, and a catalyst. A fatty acid is also preferably present.

The amount of diol used should be the stoichiometric equivalent needed to react with the carboxylic compound, plus about 30 to about 60 equivalent percent in excess. A mixture of diols is preferred to prevent crystallization.

The catalysts were described in the discussion of the cross-linkable polyester.

The fatty acid which is preferably present should be used in an amount equal to about 3 to about 10 mole percent of the carboxylic compound.

The composition is then heated to form the linear polyester. A preferred reaction schedule is to heat rapidly to 160° C. and then increase the temperature at a rate of 15° C. per hour up to 260° C., and to hold it at that temperature for eight hours. The composition is then cut with carbitol to about 55 to about 75% solids.

PREPARATION OF POLYESTER-AMIDE-IMIDE

In making the polyester-amide-imide, it is preferable to first prepare a polyester. This polyester is made by reacting a polyol, a carboxylic compound, and a catalyst. A fatty acid is preferably also present.

The polyol is a mixture of a diol and a triol in a molar ratio of about 1:3 to about 1:10. The preferred molar ratio is about 1:4 to about 1:5. The amount of polyol used should be equal to the stoichiometric equivalent needed to react with the dicarboxylic acid, plus about 80 to 100 equivalent percent in excess.

The carboxylic compound was described in the discussion of the cross-linkable polyester.

A fatty acid is also preferably present. The amount of fatty acid should be about 5 to about 10 mole percent based on the carboxylic compound. The polyester is prepared by heating this composition, preferably by heating rapidly to 180° C. then at a rate of 15° C. pr hour to 220° C. to an acid number of less than 5.

After the polyester is prepared, and while it is still hot, a diamine and trimellitic anhydride are added. The molar ratio of diamine to trimellitic anhydride should be about 1:1 to about 0.8:1. Sufficient diamine and trimellitic anhydride should be used so that the amide plus the imide groups in the polyester-amide-imide component are from 1 to about 2.5 times the number of ester groups. After the diamine and trimellitic anhydride have been added, the composition is heated to produce a clear fluid resin. This may advantageously be accomplished at about 190° C. to about 210° C.

At this point, it is preferable to add additional trimellitic anhydride to increase the total carboxyls in the reaction by about 3 to about 7 mole percent of the total carboxylic compound. It is also preferable to add THEIC in an amount equal to about 5 to about 10 equivalent percent based on the total polyol. If additional trimellitic anhydride and THEIC are added, the reaction is continued until these ingredients are reacted in. This may be accomplished at about 200° C. to about 210° C. for about one-half hour for each ingredient. The composition is then cut with carbitol to about 55 to about 75% solids.

PREPARATION OF CRESOL FORMALDEHYDE RESIN

The cresol formaldehyde resin is prepared by reacting a phenol with formaldehyde in the presence of a amine catalyst. Suitable phenols which can be used include meta para cresol, phenol, t-butyl phenol, etc. The preferred phenol is meta para cresol. Formaldehyde is used as a mixture with water of 40% formaldehyde and 60% water. The molar ratio of phenol to actual formaldehyde present should be about 1.2:1 to about 1.6:1.

Amine catalysts which can be used include various amines, such as triethanolamine, dimethylethanol amine, or benzyldimethylamine. The preferred amine catalyst is triethanolamine. The amount of catalyst should be about 5 to about 12% by weight based on the total weight of the composition.

The composition is then heated to form the cresol formaldehyde resin. The reaction is preferably carried on by refluxing for about an hour and one-half at 100° C., decanting off the water, neutralizing the catalyst with salicylic acid, then heating to 40° to 80° C. under 26 mm of mercury pressure to about 36 poises viscosity. The composition is then cut with carbitol to about 40 to about 60% solids.

PREPARATION OF POLYESTER-AMIDE-IMIDE BLEND

The polyester-amide-imide wire enamel blend is prepared by mixing together about 30 to about 50% (by weight based on total solids) of the polyester-amide-imide portion, about 20 to about 30% of the linear polyester portion, about 10 to about 20% of the cross-linkable polyester portion, and up to about 15% of the cresol formaldehyde resin portion. The blend also preferably contains about 2 to about 5% hexamethoxymethyl melamine to improve cut-through, and about 2 to about 5% adhesion promoters such as organic titanates, for example, tetraisopropyl titanate or tetrabutyl titanate. The cresol formaldehyde resin portion is preferably present and a preferred amount is up to about 10%. The blend also preferably contains up to about 2% copper ethyl aceto acetate, cobalt naphthanate, or manganese naphthanate (at 6% cobalt or manganese) to improve adhesion.. The polyester-amide-imide wire enamel blend also preferably includes up to 20% by weight of an end-blocked isocyanate to improve adhesion as tested for in the Emerson scrape test. A cyclic trimer of toluene diisocyanate end-blocked with phenol or some other end-blocked isocyanate may be used, but the preferred end-blocked isocyanate is a THEIC-terephthalate ester urethane isocyanate blocked with meta para cresol (see Example VI) because it does not detract from flexibility as other isocyanates do.

The polyester-amide-imide wire enamel blend contains no water, no cresylic acid, and no other solvent except for the carbitol. Although water is present with the formaldehyde, it is boiled off before the blend is completed.

Mixtures of various components and ingredients are also contemplated. The blend is preferably prepared by mixing at about 80° to about 90° C. It is then filtered to remove any solid matter. The polyester-amide-imide wire enamel blend can also be prepared by preparing the cross-linkable polyester, the linear polyester and the polyester-amide-imide component together in sequence in the same reaction vessel. (See Examples 1 and 8). Another alternative is to include all the fatty acids in one of the polyester components instead of dividing it between the three different polyesters.

The blend can then be coated onto wire and cured. A suitable cure procedure is to run the wire at a rate of 22 to about 28 feet per minute through a 12-ft. high tower at 450° C.

The following examples further illustrate this invention.

EXAMPLE 1

The following reactants are charged into a 3-liter, 4-neck reaction flask equipped with a heater, motor stirrer, nitrogen sparge tube, thermometer, and steam condenser:

| 380.0 g | ethylene glycol | (6.12 M) |
| --- | --- | --- |
| 61.2 g | triethylene glycol | (0.402 M) |
| 116.4 g | soya fatty acid | (0.414 M) |
| 232.0 g | trimellitic anhydride | (1.206 M) |

The mixture is stirred and heated at 10° C. per hour from 180° C. to 200° C. to a clear solution to make a polyester having excess hydroxyl groups. Then the following ingredients are added:

| 392.0 g | methylene dianiline | (1.972 M) |
| --- | --- | --- |
| 448.0 g | trimellitic anhydride | (2.330 M) |

The reaction is continued at 185° to 195° C. A hard semi-solid turbid polyester-amide-imide forms which, upon continued heating becomes clear and fairly fluid with a ball and ring softening temperature of 60° C. At this point, the following ingredients are added to the reaction flask:

| 207.0 g | terephthalic acid | (1.248 M) |
| --- | --- | --- |
| 5.6 g | dibutyl tin oxide | |
| 13.2 g | distilled water | |

The reaction is continued at a 15° C./hour temperature increase to 190°–225° C. to esterify more of the excess hydroxyl groups. After 4 hours reaction the resinous solution is clear and a ball and ring softening temperature of 106° C. is obtained. The reaction is cooled to 190° C. and 261.0 g tris (2-hydroxyethyl) isocyanurate (1.0 M) is added and the reaction is continued for ½ hour at 190° to 200° C. to a ball and ring softening temperature of 82° C. The resinous product is cooled and dissolved into 542 g carbitol and 271 g tetraethylene glycol diacrylate. (The TEGDA is a reactive diluent which was added for smoothness.) The yield of polyester-amide-imide is 2710 g solution at 70% non-volatiles.

The solution is coated on #18 AWG copper wire in a 15-ft. vertical wire tower at 400° C. maximum temperature, using four passes with standard doghouse dies with 43 to 45 mil diameter openings and a solution temperature of 50° C. The wire is smooth at coating speeds of 16 to 22 ft. per minute and 3.5 mils build and has good properties. The wire passes quick snap test, 30% elongation+1X mandrel, 1X mandrel heat shock at 175° C., 11 to 12 kV electric strength, 230° to 290° C. cut through with 2 kg wt. on crossed wires, and 12-lb. Emerson scrape. The thermal life test (1000 V on twisted pairs) shows 84 hours at 250° C., 1308 hours at 225° C. and 11,300 hours at 200° C. indicating a 20,000 hours-life at 195° C.

EXAMPLE 2

Part I

The following reactants are heated in a 1L reaction flask equipped as in Example 1 to prepare a polyester:
- 212.0 g ethylene glycol
- 135.2 g triethylene glycol
- 101.0 g tris (2-hydroxyethyl) isocyanurate
- 56.0 g soya fatty acid
- 4.7 g dibutyl tin oxide
- 263.0 g terephthalic acid The reaction mixture is heated with stirring and nitrogen sparging to 180° C. to 220° C. at 15° C./hour until a 3.8 acid number is obtained. At this point, additional ingredients are charged to prepare a polyester-amide-imide component:
- 335.6 g meta phenylene diamine
- 596.0 g trimellitic anhydride The reaction is continued at 190° to 210° C. resulting in a turbid semi-solid material progressing to a clear fluid resin with a 100° C. ball and ring softening temperature. At this point, 48.0 g trimellitic anhydride is added and the reaction continued for ½ hour at 190° to 200° C. The reaction is cooled to 190° C. and 130.4 g of tris (2-hydroxyethyl) isocyanurate is added. The reaction is continued at 205° to 210° C. to a ball and ring softening temperature of ~115° C. It is then cooled and diluted with 728.0 g of carbitol. The yield is 2356.0 g of solution at 70% non-volatiles.

Part II

The following ingredients are charged into a 2 L reaction flask to prepare a cross-linked polyester:
- 522.2 g tris (2-hydroxyethyl) isocyanurate
- 30.0 g triethylene glycol
- 388.2 g dimethyl terephthalate
- 40.3 g soya fatty acids
- 3.0 g tetra isopropyl titanate in 100 g carbitol acetate With nitrogen sparging and a steam condenser, the mixture is heated at 180° to 205° C. at 10° C. per hour, then with a short air condenser to 250° C. The reaction is held at 250° C. for 2 hours and cooled to 200° C. where 300 g of carbitol is added. The yield is 1233 g of solution at 68% non-volatiles.

Part III

The following ingredients are added to a 5-liter reaction flask to prepare a linear polyester:
- 1941.0 g dimethyl terephthalate
- 310.5 g ethylene glycol
- 300.5 g 1,4-butanediol 348.0 g neopentyl glycol
500.5 g triethylene glycol
121.0 g soya fatty acids
15.0 g tetra isopropyl titanate in 125 g xylene With nitrogen sparging and a steam condenser, the ingredients are heated 160° C. to 260° C. at 15° C. per hour and the reaction continued for 8 hours at 260° C. The resinous mixture is cooled and 1090 g of carbitol is added. The yield is 3706 g of a turbid solution at 69% non-volatiles.

Part IV

A 3-liter reaction flask is charged with the following ingredients to prepare a phenol formaldehyde resin:
1376.0 g meta para cresol
605.0 g formaldehyde (40%)
23.4 g triethanolamine The mixture is stirred and heated with a watercooled reflux condenser attached with condensate returned to the flask for 1½ hours at reflux. The reaction is cooled to 55° C., allowed to settle in a separatory funnel and removed from the water layer. It is recharged to the reaction flask and 21.7 g of salicyclic acid is added and the product is heated 40° to 80° C. at 26 mm Hg pressure until a viscosity of 36 poises is obtained. At this point, 1695 g cresylic acid is added and a solution is obtained containing 29% non-volatiles. (The use of cresylic acid is not part of this invention, but illustrates the prior procedure. See Example 4, Part II where a carbitol is substituted for the cresylic acid.)

The following blend is prepared from the previously prepared solutions:
164.9 g of Part I
110.0 g of Part III
55.0 g of Part II
36.8 g of Part IV
13.6 g of hexamethoxymethyl melamine (Cymel 301-American Cyanamide)
13.6 g of tetraisopropyl titanate dissolved in 13.6 g cresylic acid
1.35 g of copper ethyl aceto acetate
10.4 g of cobalt naphthanate at 6% cobalt The blend is stirred and heated for 1 hour at 80° to 90° C. The blend has a viscosity of 13,000 cp at 40° C. and a non-volatile content of 60%. When die-coated on #18 AWG copper wire with six passes at 22 ft/min to 28 ft/min, it gives a very smooth coating with good flexibility (20 to 30% elongation plus 1X mandrel) which passes 1X heat shock at 17° C. to 200° C., 302° C. cut-through, 11 to 12 kV electric strength, and 20-lb. Emerson scrape. Preliminary thermal life test on twisted pairs (12 hours at 275° C.; 228 hours at 250° C.; and >1700 hours at 225° C.) indicate a thermal life of 20,000 hours above 190° C.

EXAMPLE 3

This example shows a much-improve Emerson scrape and cut-through temperature with slightly lower flexibility and coating smoothness.

Part I

The following ingredients are charged into a 3-liter reaction flask to prepare a cross-linked polyester:
57.0 g triethylene glycol
210.0 g ethylene glycol
755.0 g dimethyl terephthalate
203.0 g tris (2-hydroxyethyl) isocyanurate
3.0 g tetraisopropyl titanate in 15.0 g cresylic acid
37.5 g xylene With nitrogen sparging and a steam-cooled reflux condenser, the ingredients are heated 160° C.–260° C. at 15° C./h then cooled to 200° C. and the following added:
462.0 g dimethyl terephthalate
618.0 g tris (2-hydroxyethyl) isocyanurate p1 3.0 g tetraisopropyl titanate in 15.0 g cresylic acid The reaction is continued at 190°–225° C. at 15° C./hours and then diluted with 600 g carbitol acetate and 600 g carbitol. A yield of 3070 g of solution at 60% non-volatiles is obtained. The following blend is prepared:
620.0 g of Part I of Example 2
443.0 g of Part I of Example 3
102.3 g of Part IV of Example 2
18.8 g of tetraisopropyl titanate dissolved in 37.6 g of cresylic acid
160.0 g of tetraethylene glycol diacrylate The blend is stirred and heated at 80° to 90° C. for 1 hour.

The solution is coated on #18 AWG copper wire in a 15-ft. vertical tower with the following results:

Baking range 22 to 28 ft/min, flexibility 10 to 25% elongation plus 1X mandrel, fairly smooth with slight waviness, heat shock 1X at 175° C., cut-through 380° C., Emerson scrape 26 to 30 lb. Thermal life data indicate a 20,000 hours life above 180° C.

EXAMPLE 4

This blend contains only Rule 66 solvent and is completely free of the non-desirable cresylic acid solvent. The solution blend coated on #18 AWG copper wire yields a film with very good smoothness, flexibility, and heat shock, but lower Emerson scrape and thermal life than that of Example 3.

Part I

The polyester-amide-imide composition is as follows (5-liter flask):
227.1 g ethylene glycol
183.3 g triethylene glycol
110.1 g 1,4-butanediol
127.5 g neopentyl glycol
84.0 g soya fatty acid
31.8 g distilled water
7.05 g dibutyl tin oxide
394.5 g terephthalic acid With nitrogen sparging and steam-cooled reflux condenser, the ingredients are heated 180° to 220° C. at 15° C./hour to an acid number of 3.0. At this point, the following ingredients are added:
377.4 g meta phenylene diamine
230.1 g 4,4'-methylene dianiline
894.0 g trimellitic anhydride The reaction is continued at 190° to 210° C. to a 92° C. ball and ring softening temperature. The reaction is cooled to 175° C. and 72.0 g of trimellitic anhydride is added and the reaction is continued at 190° to 200° C. for ½ hour where 195.6 g of tris (2-hydroxyethyl) isocyanurate is added. The reaction is continued at 205° to 210° C. until a ball and ring softening temperature of 115° C. is obtained. The resin is dissolved in 1116.0 g of carbitol. A yield of 3602 g of solution at 70% non-volatiles is obtained.

PART II

This resin preparation is the same as that of Part IV of Example 2 except that the 1965 g of cresylic acid solvent at the end of the reaction is replaced by 524 g of carbitol acetate. A yield of 1935 g of solution at 48.6% solids is obtained.

The following ingredients are blended:
186.5 g Part I, Example 4
57.2 g Part II, Example 2
129.2 g Part III, Example 2
56.0 g tetraethylene glycol diacrylate
40.5 g Part II, Example 4
11.2 g tetraisopropyl titanate dissolved in 11.2 g carbitol The solution blend is stirred and heated at 80° to 90° C. for 1 hour. The blend is diecoated on #18 AWG copper wire at six passes and is very smooth at 3.0 and 3.5 mils build at 22 ft/min. All samples are very flexible, passing 30% elongation plus IX mandrel, and also pass 250° C. IX heat shock. The cut-through temperature at 22 ft/min is 310° C. and the Emerson scrape is 12 to 14 lb. The thermal life data (12 hours at 275° C., 156 hours at 250° C., 528 hours at 225° C. and 1350 hours at 200° C.) extrapolates to ~165° C. for a 20,000 hour life.

EXAMPLE 5

The reactions and blend are exactly the same as those of Example 2 except that in Part I of Example 2 the 335.6 g of metal phenylenediamine is replaced by 304.0 g of 2,4-diamino toluene and 76.0 g of 2,6-diamino toluene. The resulting blend is coated on #18 AWG copper wire at 22 to 28 ft/min and is smooth with good flexibility (20 to 30% elongation+1 X mandrel), 175° to 225° C. 1 X heat shock, 310° C. cut-through, and 14 to 16 lb. Emerson scrape.

EXAMPLE 6

This blend is the same as that of Example 3 except that it includes an end-blocked ester-urethaneisocyanate prepared in the following manner with the following ingredients added to a 3-liter flask:
522.0 g tris (2-hydroxyethyl) isocyanurate
166.0 g terephthalic acid
11.0 g distilled water
2.5 g dibutyl tin oxide With nitrogen sparging and a downward water condenser to condense out the water of reaction, the mixture is heated at 210° C. to 260° C. at 15° C./hour until 44.5 g water is condensed out whence 552 g carbitol acetate is added and the solution is cooled. In a separate container, 690 g of a mixture containing 80%, 2,4-toluene diisocyanate and 20% 2,6-toluene diisocyanate is added slowly to 531 g carbitol and reacted ½ hour at 100° C. whence 360 g of carbitol acetate is added. This product is cooled and added to the 3-liter reaction flask and reacted 1 hour at 100° to 105° C. The yield is 2775 g of solution at 50% non-volatiles.

A blend is prepared the same as that of Example 3 except that 168 g of the above-prepared solution is added. When coated on #18 AWG copper wire, the same properties as those of Example 3 are obtained except that the wire is smoother and slightly higher Emerson scape (32 lb) is obtained.

EXAMPLE 7

In this example, the ester-amide-imide portion does not contain a fatty acid. Fairly smooth coatings with good properties are obtained. The ester-amide-imide composition is as follows:
106.0 g ethylene glycol
67.6 g triethylene glycol
10.6 g distilled water
2.35 g dibutyl tin oxide
131.5 g terephthalic acid The ester portion is reacted 180° C. to 220° C. to a clear solution and the amide-imide portion is charged:
57.0 g carbitol acetate (solvent)
167.8 g meta phenylenediamine
298.0 g trimellitic anhydride The reaction is continued at 190° to 210° C. through the semi-solid to a clear state where 43.2 g trimellitic anhydride is added and the reaction continued ½ hour at 190° to 200° C. Then 115.7 g tris (2-hydroxyethyl) isocyanurate is added and the reaction is continued an additional 3 hours at 205° to 210° C., whence 285 g carbitol is added and the solution is cooled. A yield of 1148 g of solution at 70% non-volatile is obtained.

The following blend is prepared completely free of the non-desirable cresylic acid solvent:
186.5 g polyester-amide-imide of this example
75.2 g Part II of Example 2
111.2 g Part III of Example 2
56.0 g tetraethylene glycol diacrylate
40.7 g Part II of Example 4
11.2 g tetraisopropyl titanate in 11.2 g carbitol This blend coats fairly smoothly on #18 AWG copper wire at 22 ft/min to 32 ft/min coating speed. The flexibility is 25% to 30% elongation plus 1 X mandrel, the 1 X heat shock passes at 200° C. to 225° C., the cut-through temperature is 332° C. at 22 ft/min bake, and the Emerson scrape is 13 to 16 lb.

EXAMPLE 8

This example has fair heat shock and good cut-through with fair flexibility and coating smoothness. This resin contains about 1% by weight of cresylic acid.

The following ingredients are charged into a reaction flask to prepare a polyester-amide-imide:
187.2 g trimellitic anhydride
87.2 g meta phenylene diamine
33.6 g triethylene glycol
112.3 g ethylene glycol
59.1 g tris (2-hydroxyethyl) isocyanurate
1.2 g tetraisopropyl titanate
2.0 g carbitol With nitrogen sparge and air-cooled condenser, the ingredients are heated forming a turbid semi-solid state which breaks up at about 185° C. The reaction is continued at 190° C. until clarity is achieved and then cooled to 170° C. At this point, 83.6 g meta phenylene diamine and 172.8 g trimellitic anhydride are added. Again, while being heated a semi-solid state forms. The reaction is continued to 198° C. where a clear solution is obtained. The reaction is then cooled to 170° C. where another 108 g trimellitic anhydride addition is made. The reaction is taken 170° C. to 190° C. at the rate of 10° per hour. At this point 44.6 g maleic anhydride is added and reacted to clarity in ~15 min. at which point 84 g of tris (2-hydroxyethyl) isocyanurate is added. The reaction is continued for ½ hour at 185° to 190° C.

The reaction is stopped at this point by adding 200 g of carbitol acetate and 300 g of carbitol. The yield is 1308 g at 62% non-volatile material.

A blend is then prepared of the following previously prepared solution:

170.0 g of polyester-amide-imide of this example
112.8 g of Part I, Example 3
30.3 g of Part IV, Example 2

The blend is then coated on #18 AWG copper wire in a 15-ft. vertical tower at speeds of 22 to 28 ft/min utilizing only four passes. The build is 2.4 to 2.7 mil with good flexibility of 20%+1 X mandrel, a 1 X heat shock of 200° C. and cut-through of 377° C. The film is fairly smooth and has an Emerson scrape of 10 to 12 lb.

What we claim is:

1. A polyester-amide-imide wire enamel blend comprising:
(A) a solution in a carbitol of a cross-linkable polyester comprising the reaction product of:
   (1) a polyol which is a mixture of a diol and a triol in a molar ratio of triol to diol of about infinity to about 1:1;
   (2) a polyfunctional carboxylic compound at least 80% by weight selected from the group consisting of terephthalic acid, isophthalic acid, alkyl esters of terephthalic acid or isophthalic acid up to $C_3$, and mixtures thereof;
   (3) a catalyst;
(B) a solution in a carbitol of a linear polyester comprising the reaction product of:
   (1) a diol;
   (2) a polyfunctional carboxylic compound at least 80% by weight selected from the group consisting of terephthalic acid, isophthalic acid, alkyl esters up to $C_3$ of terephthalic acid or isophthalic acid, and mixtures thereof;
   (3) a catalyst; and
(C) a solution in a carbitol of a polyester-amide-imide component comprising the reaction product of:
   (1) a polyester which comprises the reaction product of
      (a) a polyol which is a mixture of a diol and a triol in a molar ratio of triol to diol of about 1:3 to about 1:10;
      (b) a polyfunctional carboxylic compound at least 80% by weight selected from the group consisting of terephthalic acid, isophthalic acid, alkyl esters up to $C_3$ of terephthalic acid or isophthalic acid, and mixtures thereof;
      (c) a catalyst;
   (2) a diamine; and,
   (3) trimellitic anhydride; and, said polyester-amide-imide wire enamel blend also containing a fatty acid component which may be reacted into any of its polyester components.

2. A polyester-amide-imide wire enamel blend according to claim 1 wherein said blend includes a solution in a carbitol of a cresol formaldehyde resin comprising the reaction product of a phenol, formaldehyde, and an amine catalyst.

3. A polyester-amide-imide wire enamel blend according to claim 2 wherein the amount of said cresol formaldehyde resin is about 7 to about 14% by weight based on total solids.

4. A polyester-amide-imide wire enamel blend according to claim 1 which includes about 2 to about 5% by weight based on total solids of an adhesion promoter of tetraisopropyl titanate.

5. A polyester-amide-imide wire enamel blend according to claim 1 wherein the diamine used in making said polyester-amide-imide component is meta phenylene diamine.

6. A polyester-amide-imide wire enamel blend according to claim 1 wherein the amount of polyol in said cross-linkable polyester is about 30 to about 60 equivalent percent in excess of the stoichiometric equivalent required to react with said polyfunctional carboxylic compound.

7. A polyester-amide-imide wire enamel blend comprising:
(A) a solution in a carbitol of a cross-linkable polyester comprising the reaction product of:
   (1) a polyol which is a mixture of a diol and a triol;
   (2) a polyfunctional carboxylic compound at least 80% by weight selected from the group consisting of terephthalic acid, isophthalic acid, alkyl esters of terephthalic acid or isophthalic acid up to $C_3$, and mixtures thereof;
   (3) a catalyst; and
   (4) about 5 to about 10 mole percent based on said polyfunctional carboxylic compound of a $C_{12}$ to $C_{18}$ monocarboxylic unsaturated acid;
(B) a solution in a carbitol of a linear polyester comprising the reaction product of:
   (1) a diol;
   (2) a polyfunctional carboxylic compound at least 80% by weight selected from the group consisting of terephthalic acid, isophthalic acid, alkyl esters up to $C_3$ of terephthalic acid or isophthalic acid, mixtures thereof;
   (3) a catalyst; and
   (4) about 3 to about 10 mole percent based on said polyfunctional carboxylic compound of a $C_{12}$ to $C_{18}$ monocarboxylic unsaturated acid; and
(C) a solution in a carbitol of a polyester-amide-imide component comprising the reaction product of:
   (1) a polyester which comprises the reaction product of
      (a) a polyol which is a mixture of a diol and a triol;
      (b) a polyfunctional carboxylic compound at least 80% by weight selected from the group consisting of terephthalic acid, isophthalic acid, alkyl esters up to $C_3$ of terephthalic acid or isophthalic acid, and mixtures thereof;
      (c) a catalyst; and
      (d) about 5 to about 10 mole percent based on said polyfunctional carboxylic compound of a monocarboxylic unsaturated acid;
   (2) a diamine; and,
   (3) trimellitic anhydride.

8. A polyester-amide-imide wire enamel blend according to claim 7 wherein said blend includes a solution in a carbitol of a cresol formaldehyde resin comprising the reaction product of a phenol, formaldehyde, and an amine catalyst.

9. A polyester-amide-imide wire enamel blend according to claim 8 wherein the amount of said cresol formaldehyde resin is about 7 to about 14% by weight based on total solids.

10. A polyester-amide-imide wire enamel blend according to claim 7 which includes about 2 to about 5% by weight based on total solids of said adhesion promoter of tetraisopropyl titanate.

11. A polyester-amide-imide wire enamel blend according to claim 7 wherein the diamine used in making said polyester-amide-imide component is meta phenylene diamine.

12. A polyester-amide-imide wire enamel blend according to claim 7 wherein the amount of polyol in said crosslinkable polyester is about 30 to about 60 equivalent percent in excess of the stoichiometric equivalent required to react with said polyfunctional carboxylic compound.

13. A polyester-amide-imide wire enamel blend comprising:
(A) a solution in a carbitol of a cross-linkable polyester comprising the reaction product of:
  (1) a polyol which is a mixture of a diol and a triol;
  (2) a polyfunctional carboxylic compound at least 80% by weight selected from the group consisting of terephthalic acid, isophthalic acid, alkyl esters of terephthalic acid or isophthalic acid up to $C_3$, and mixtures thereof;
  (3) a catalyst; where the amount of said crosslinkable polyester by weight based on total solids is about 10 to about 20%; and
(B) a solution in a carbitol of a linear polyester comprising the reaction product of:
  (1) a diol;
  (2) a polyfunctional carboxylic compound at least 80% by weight selected from the group consisting of terephthalic acid, isophthalic acid, alkyl esters up to $C_3$ of terephthalic acid or isophthalic acid, and mixtures thereof;
  (3) a catalyst; where the amount of said linear polyester by weight based on total solids is about 20 to about 30%; and
(C) a solution in a carbitol of a polyester-amide-imide component comprising the reaction product of:
  (1) a polyester which comprises the reaction product of
    (a) a polyol which is a mixture of a diol and a triol;
    (b) a polyfunctional carboxylic compound at least 80% by weight selected from the group consisting of terephthalic acid, isophthalic acid, alkyl esters up to $C_3$ of terephthalic acid or isophthalic acid, and mixtures thereof;
    (c) a catalyst;
  (2) a diamine; and,
  (3) trimellitic anhydride; where the amount of said polyester-amide-imide component by weight based on total solids is about 30 to about 50%, and,
said polyester-amide-imide wire enamel blend also containing a fatty acid component which may be reacted into any of its polyester components.

14. A polyester-amide-imide wire enamel blend according to claim 13 wherein said carboxylic acid in said cross-linkable polyester, in said linear polyester, and in said polyester-amide-imide, is a dimethyl ester of terephthalic acid.

15. A polyester-amide-imide wire enamel blend according to claim 13 wherein said blend includes a solution in a carbitol of a cresol formaldehyde resin comprising the reaction product of a phenol, formaldehyde, and an amine catalyst.

16. A polyester-amide-imide wire enamel blend according to claim 15 wherein the amount of said cresol formaldehyde resin is about 7 to about 14% by weight based on total solids.

17. A polyester-amide-imide wire enamel blend according to claim 13 wherein said blend includes about 2 to about 5% by weight based on total solids of an adhesion promoter and up to about 2% by weight based on total solids of a compound selected from the group consisting of copper ethyl aceto acetate, cobalt naphthanate, or manganese naphthanate at 6% cobalt or manganese.

18. A polyester-amide-imide wire enamel blend according to claim 17 wherein said adhesion promoter is tetraisopropyl titanate.

19. A polyester-amide-imide wire enamel blend according to claim 13 wherein said cross-linkable polyester, said linear polyester, and said polyester-amide-imide are prepared in sequence in the same reaction vessel.

20. A polyester-amide-imide wire enamel blend according to claim 13 wherein said diol in said linear polyester is a mixture of diols.

21. A polyester-amide-imide wire enamel blend according to claim 13 wherein said carbitol is selected from the group consisting of diethylene glycol monoethyl ether, diethylene glycol monoethyl ether acetate, and mixtures thereof.

22. A polyester-amide-imide wire enamel blend according to claim 13 wherein the diol used in components of said blend is selected from the group consisting of triethylene glycol, ethylene glycol, 1,4-butane diol, neopentyl glycol, and mixtures thereof, and the triol used in the components of said blend is tris (2-hydroxyethyl) isocyanurate.

23. A polyester-amide-imide wire enamel blend according to claim 13 wherein the fatty acid is soya.

24. A polyester-amide-imide wire enamel blend according to claim 13 wherein the diamine used in making said polyester-amide-imide component is meta phenylene diamine.

25. A polyester-amide-imide wire enamel blend according to claim 13 wherein the amount of polyol in said cross-linkable polyester is about 30 to about 60 equivalent percent in excess of the stoichiometric equivalent required to react with said polyfunctional carboxylic component.

* * * * *